United States Patent
Hasegawa (10) Patent No.: US 7,974,514 B2
(45) Date of Patent: Jul. 5, 2011

(54) IMAGE DATA PROCESSING DEVICE AND IMAGE DATA PROCESSING METHOD

(75) Inventor: Hiroshi Hasegawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1191 days.

(21) Appl. No.: 11/589,151

(22) Filed: Oct. 30, 2006

(65) Prior Publication Data

US 2007/0097805 A1    May 3, 2007

(30) Foreign Application Priority Data

Oct. 31, 2005    (JP) .................................. 2005-315661

(51) Int. Cl.
*H04N 9/80* (2006.01)
(52) U.S. Cl. ........................................ 386/241; 386/287
(58) Field of Classification Search ................... 386/46, 386/52, 95, 125, 126, 200, 241, 278, 332
See application file for complete search history.

(56) References Cited

U.S. PATENT DOCUMENTS

| 5,546,365 A * | 8/1996 | Roth ........................... 369/30.09 |
| 7,283,429 B2 * | 10/2007 | Suzuki ....................... 369/30.09 |
| 7,366,733 B2 * | 4/2008 | Matsumi et al. .............. 707/821 |
| 7,707,231 B2 * | 4/2010 | LaChapelle et al. ........... 707/804 |
| 2007/0172208 A1 * | 7/2007 | Okada et al. ................. 386/95 |

FOREIGN PATENT DOCUMENTS

| EP | 1 548 739 A1 | 6/2005 |
| EP | 1 553 585 A1 | 7/2005 |
| JP | A-2004-208172 | 7/2004 |

* cited by examiner

*Primary Examiner* — Huy T Nguyen
(74) *Attorney, Agent, or Firm* — Morgan, Lewis & Bockius LLP (57) ABSTRACT

When original data are stored, an association information storage area is reserved for each of the original data. When the original data are referred to by a playlist function and a partial area of the original data is registered in a playlist, an identifier for identifying the playlist that made the reference uniquely is stored in the association information storage area that the referred original data have. If a user issues an instruction to delete the original data, the association information storage area of the original data to be deleted is referred to, so that the stored identifier of the playlist of the reference origin is obtained. The playlist of the reference origin is identified based on the obtained identifier, and the identified playlist is deleted or edited.

6 Claims, 6 Drawing Sheets

IMAGE DATA PROCESSING DEVICE AND IMAGE DATA PROCESSING METHOD

This application is based on Japanese Patent Application No. 2005-315661 filed on Oct. 31, 2005, the contents of which are hereby incorporated by reference.

BACKGROUND OF THE INVENTION

1. Field of the Invention

The present invention relates to an image data processing device and an image data processing method. More specifically, the present invention relates to an updating process of an image data index when image data are deleted.

2. Description of Related Art

In recent years, digital image data processing devices including a DVD (Digital Versatile Disk) recorder and an HDD (Hard Disk Drive) recorder have become widely available as devices for recording and reproducing image data (contents) handled in image processing devices such as a television set. As one of functions of the image data processing devices, there is a playlist (image data index) function.

The playlist function is a function utilizing a random access function that is equipped to recording media including a DVD and an HD. The random access function means a function for performing various image processes by using positional information (address information) in the image data obtained from recording process. The recording medium having the random access function facilitates editing or the like of recorded contents without a special editing device.

For example, when reproduction of contents is halted, address information of the halted position can be set easily as a restart position for the next reproduction by using the random access function. Thus, a user can play the contents from the position halted last time easily without a fast forward operation or the like.

Furthermore, for example, extracting a part of the image or combining extracted images can be performed by designating a plurality of address information of a plurality of contents. In other words, a part or a whole of a plurality of contents can be played continuously in any order. A set of the address information for playing continuously as described above is usually called a playlist. A function for creating such a playlist or for performing continuous playing using a playlist is the playlist function.

As a conventional technique about the above-mentioned playlist function, JP-A-2004-208172 discloses an image data processing device, which can reset easily a boundary position of partial areas of image data registered on the playlist (a part or a whole of image data extracted based on address information).

In general, when a new playlist is created from a partial area registered on the playlist, a leading portion or a trailing portion of the image or the sound included in a range of the partial area may be cut, or an undesired scene may be added to the leading portion or the trailing portion in the partial area. In this case, the user of the image data processing device in many cases has no choice but to adjust the partial area when setting the partial area of original data (image data to be an original of the partial area to which the playlist refers). On the other hand, an image data processing device disclosed in JP-A-2004-208172 can edit the partial area on an edit display (playlist creating display) afterward, for performing reset such that a boundary area between cells is shifted or that an entry point (EP) in a cell is shifted.

If a user can reset a start point and an end point of a partial area easily in this way, it is possible to create a high quality edited image particularly in the edit process (playlist creating process).

However, in the playlist function equipped to the conventional image data processing device disclosed in JP-A-2004-208172, it is necessary to delete the playlist that refers to the original data to be deleted (the playlist created by using the partial area of the data to be deleted) or to update contents of the same when the original data is deleted. In this case, in order to detect all the playlists that refer to the data to be deleted, it is necessary to search a MAP information (information indicating which playlist refers to which original data) of all the playlists.

Figure 6:
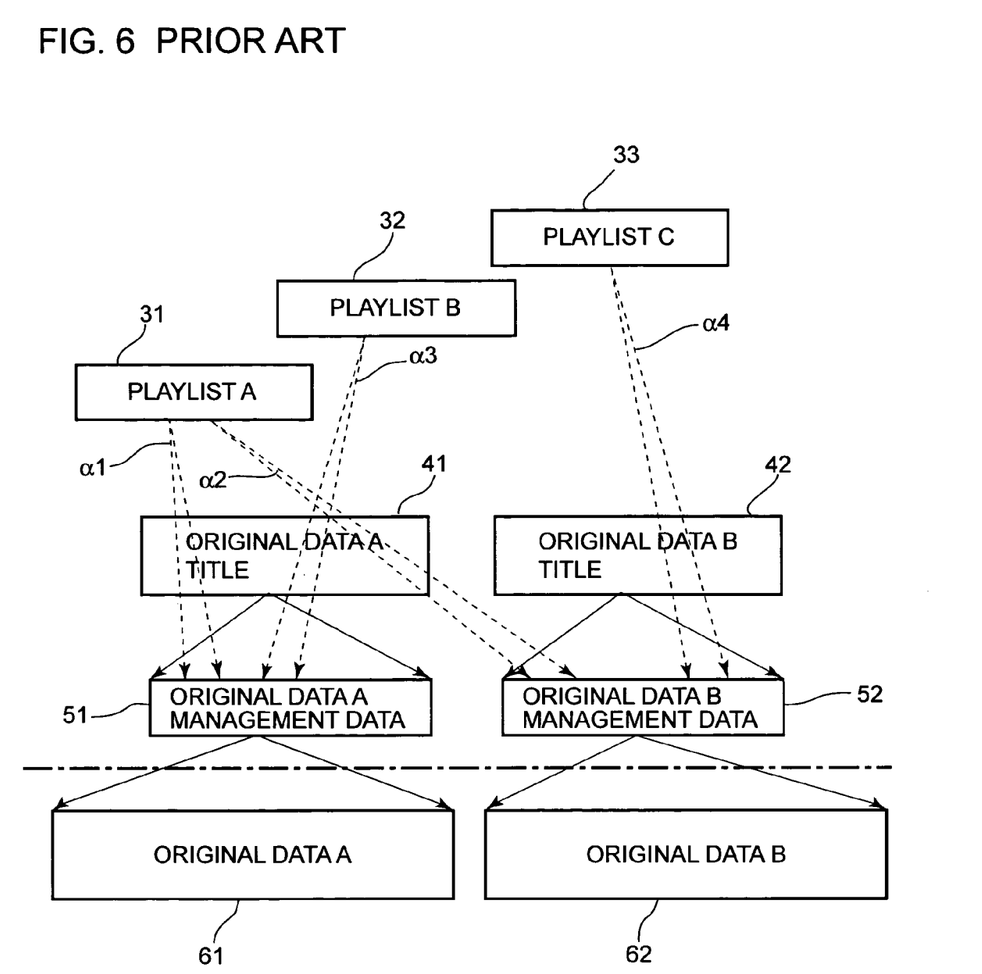
FIG. 6 is a block diagram showing a relationship among various data in a conventional image data processing device.

A concrete example of the above-mentioned process will be described with reference to FIG. 6. FIG. 6 is a block diagram showing a relationship among original data, original data management data, original data titles and a playlist concerning the playlist function. As shown in FIG. 6, the original data (original data A 61 and original data B 62), the original data management data (original data A management data 51 and original data B management data 52) and the original data titles (an original data A title 41 and an original data B title 42) have a one-to-one relationship, respectively. In the example shown in FIG. 6, there are three playlists (a playlist A 31, a playlist B 32 and a playlist C 33) that refer to the original data management data. Note that a dot and dash line in FIG. 6 indicates a boundary between the management data and real image data. The management data are located above the dot and dash line while the real image data are located below the same.

As an example, a process when a user creates the playlist A 31 will be described. The user selects the original data title of the contents to be registered in the playlist (the original data A title 41 and the original data B title 42 in this example) from a plurality of original data titles. Then, the user performs designation of a range to be extracted (extraction of a partial area) from the original data management data corresponding to the selected original data title (the original data A management data 51 and the original data B management data 52 in this example) (see arrows α1 and α2 in FIG. 6).

The user performs the above-mentioned process once or a plurality of times so that the partial area is extracted. The extracted partial area is stored in a hard disk or the like together with its address information. Then, the user designates an order of reproducing the plurality of extracted partial areas. Information of the reproduction order generated by this designation becomes the playlist A 31.

As another example, a process when a user deletes original data B 62 will be described. When the original data B 62 are deleted, the original data B title 42 and the original data B management data 52 that have a one-to-one relationship are also deleted at the same time. However, since the playlist A 31 and the playlist C 33 refer the original data B management data 52 (see arrows α2 and α4 in FIG. 6), these two playlist must be deleted, too.

The above-mentioned deleting process is performed in the following procedure.

(1) Check that the original data B title 42 and the original data B management data 52 are related to each other.

(2) Confirm contents of all the playlists (the playlist A 31 through the playlist C 33) for checking which playlist is using the original data B management data 52.

(3) Identify the playlists (the playlist A 31 and the playlist C 33) that are using the original data B management data 52 based on a result of the confirmation and delete the playlists.

(4) Delete the original data B title 42, the original data B management data 52, and the original data B 62.

It may take long time for the process of confirming the contents of all the playlists in the step (2) of the above-mentioned deleting process. It is because many playlists of a hundred or more can be created by a DVD recorder or the like that is available on the market at present. In addition, there is a problem that the above-mentioned process itself is complicated.

Although the playlist is created based on the original data in the above-mentioned example, it is also possible to create the playlist based on image data registered in the playlist (a partial area of the original data). Alternatively, it is also possible to create the playlist by using both the original data and the image data registered in the playlist. In these cases, the above-mentioned conventional deleting process has poor processing efficiency, and the number of processing steps increases rapidly. In addition, the processing time necessary for the deleting process of the original data increases in proportion to the number of the playlists. The user may hardly endure the long waiting time until the deleting process is completed.

SUMMARY OF THE INVENTION

An object of the present invention is to provide an image data processing device having a playlist function that can perform a fast and easy process of deleting playlists that refer to original data to be deleted when a user deletes the original data (or a original data title).

An image data processing device according to an aspect of the present invention includes a memory portion for storing image data; and a control portion for extracting a part or the whole of the image data as a partial area, determining a reproduction order for continuously reproducing one or more of the extracted partial areas in accordance with an instruction from a user, and storing the determined reproduction order as an image data index in the memory portion. The control portion includes an association information storage area generation portion for generating an association information storage area for storing association information that indicates association between the image data and the image data index in the memory portion for each of the image data when the image data is stored in the memory portion.

According to this structure, when the recording process of contents is performed so that original data (image data) are stored in a data storage area of a hard disk recorder, it is expected that the an association between the original data and the playlist will be made by the playlist function later, and a storage area (association information recording area) for storing information of the association (association information) is generated by the original data in the data storage area. It is preferable to generate the association information recording area in a discrete manner physically for each of the original data.

In a preferred embodiment of the present invention, the control portion further includes an association information storing portion for storing an identifier for discriminating the image data index uniquely in the association information storage area of the image data to which the image data index is associated when one or more of the partial areas of the image data are associated to the image data index.

According to this structure, when one or more of the partial areas of the original data are registered in the playlist, an identifier for discriminating the playlist of the registration uniquely (a playlist title, for example) is stored in the association information recording area.

In another preferred embodiment of the present invention, the control portion further includes an image data index updating portion for identifying the image data index that is associated to the image data and updating the identified image data index based on the identifier of the image data index stored in the association information storage area of the image data to be deleted when the image data are deleted.

According to this structure, when original data stored in the data storage area are deleted by a user, the control portion refers to the association information recording area of the original data to be deleted and identifies the playlist that is associated to the original data to be deleted. The control portion deletes the identified playlist or updates contents of the playlist (deletes only a part associated to the original data to be deleted).

In still another preferred embodiment of the present invention, the control portion extracts a part or the whole of image data registered in the image data index or the image data as a partial area, determines a reproduction order for continuously reproducing one or more of the extracted partial areas in accordance with an instruction from a user, and stores the determined reproduction order as an image data index in the memory portion.

According to this structure, even if the playlist is generated based on image data registered in the playlist (a partial area of original data), or if the playlist is generated based on both the original data and image data registered in the playlist, all the playlists associated to the original data to be deleted are identified, so that the identified playlists are deleted or contents thereof are updated when the original data are deleted.

According to the present invention, when image data (original data) is deleted, it is not necessary to search MAP information of all the playlists for making a playlist that refers to the image data to be deleted. Therefore, the number of steps of the search process in the image data deleting process can be reduced substantially so that user's waiting time during the deleting process can be shortened.

DESCRIPTION OF THE PREFERRED EMBODIMENTS

Now, an embodiment of the present invention will be described with reference to the attached drawings.

(1. Inner Structure of HDD Recorder)

First, a main structure of an electric circuit system of an HDD recorder that is an image data processing device according to an embodiment of the present invention will be described with reference to a block diagram shown in FIG. 5.

Figure 5:
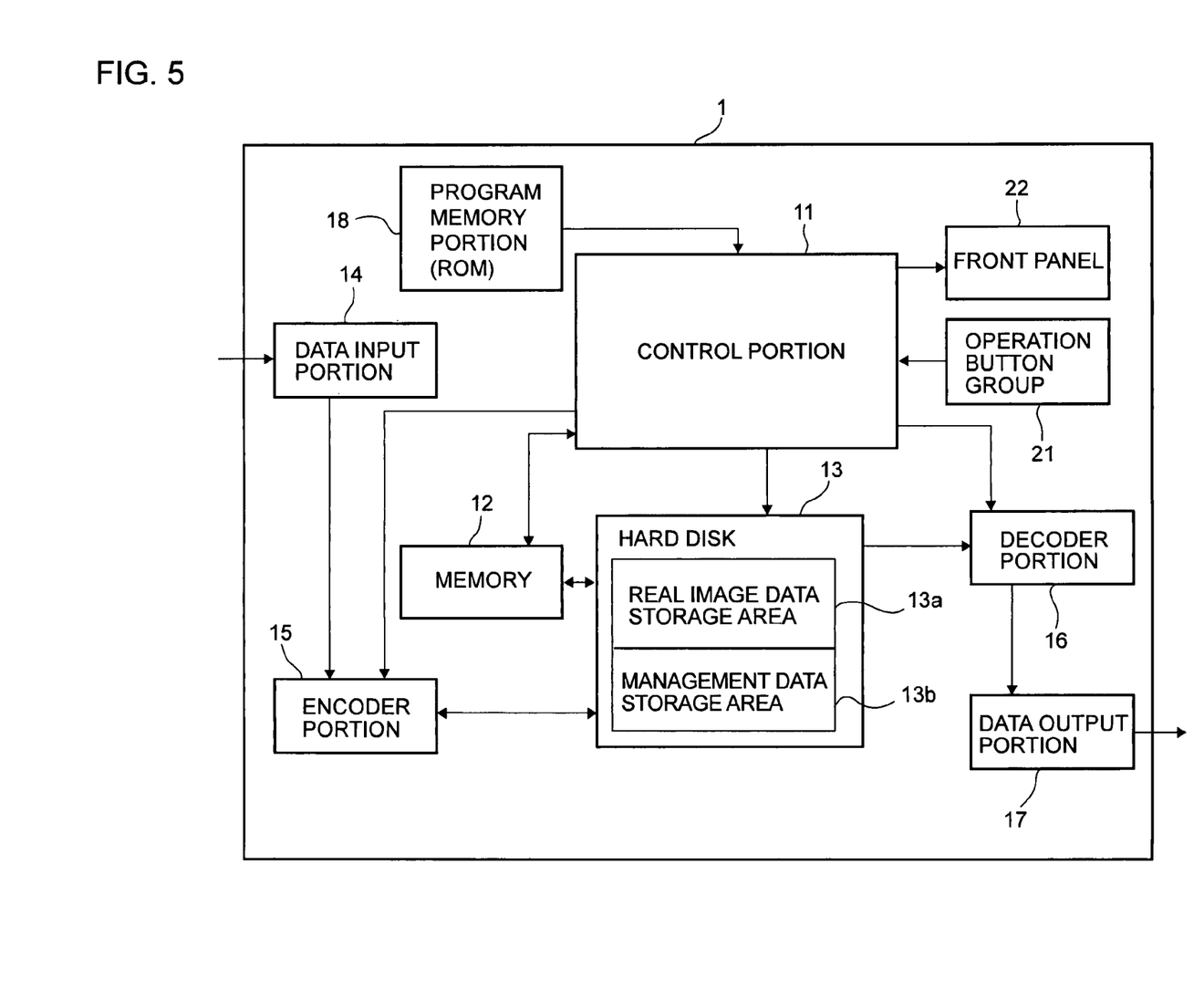
FIG. 5 is a block diagram showing a main structure of the image data processing device according to the present invention.

As shown in the block diagram of FIG. 5, the HDD recorder 1 of this embodiment includes a control portion 11, a memory 12, a hard disk 13, a data input portion 14, an encoder portion 15, a decoder portion 16, a data output portion 17, a program memory portion 18, an operation button group 21, and a front panel 22.

The control portion 11 is a central processing unit for controlling each portion of the HDD recorder 1 so as to control image data processing (record, reproduction, and the like of contents) in an integral manner. In addition, the control portion 11 controls each device (e.g., the hard disk 13 or the like) and performs a calculation or manipulation process of data.

The memory 12 is a medium for memorizing temporarily various data stored by the HDD recorder 1, and it is made up of a writable RAM (Random Access Memory) or the like. The memory 12 has a role to serve as a buffer memory for memorizing temporarily process data for the control portion 11 to perform various data processing and instructions or the like issued by a user, for example.

The hard disk 13 is a magnetic storage medium for recording various data (such as image data, sound data, or management data) kept by the HDD recorder 1. It is preferable that the hard disk 13 is physically divided into a plurality of areas (partitions) in accordance with types of data to be recorded. For example, the hard disk 13 includes a real image data storage area 13a and a management data storage area 13b. The real image data storage area 13a is an area for storing real image data (original data) obtained by recording. The management data storage area is an area for storing management data of the original data or index data such as a playlist generated from the original data.

The data input portion 14 is an input interface for inputting digital data (image data) from an external device such as a digital tuner. In addition, when analog signals (image signal and sound signal) are inputted for example, A/D converters (Analog Digital Converters) are used for converting the analog signals into digital data.

The encoder portion 15 is a process circuit for compressing (encoding) the image data by a moving image compressing method such as MPEG2 and for compressing the sound data by a sound compressing method such as Dolby AC-3 or LPCM. Note that the data to be compressed are image data, sound data, and the like inputted by the data input portion 14, for example.

The decoder portion 16 is a processing circuit for expanding (decoding) the image data and the sound data compressed by the encoder portion 15 or the like. The expanded data are outputted to an external device through the data output portion 17 or the like, for example.

The data output portion 17 is an output interface for outputting image data and sound data to an external device such as a monitor. If the external device has only an analog interface, a D/A converter (Digital to Analog Converter) is used for converting the image data and the sound data into analog signals (an image signal and a sound signal), which is then outputted.

The program memory portion 18 is a storage medium for storing program data for the control portion 11 to perform various processes (such as an input and output control of image data), for example. As the program memory portion 18, a ROM (Read Only Memory) or the like that can only read information can be used, for example.

The operation button group 21 is an input interface for the user to perform various instructions including recording and reproduction of contents on the HDD recorder 1. The front panel 22 is a user interface for displaying various information of the HDD recorder 1 for the user.

(2. Recording Process Step)

Figure 1:
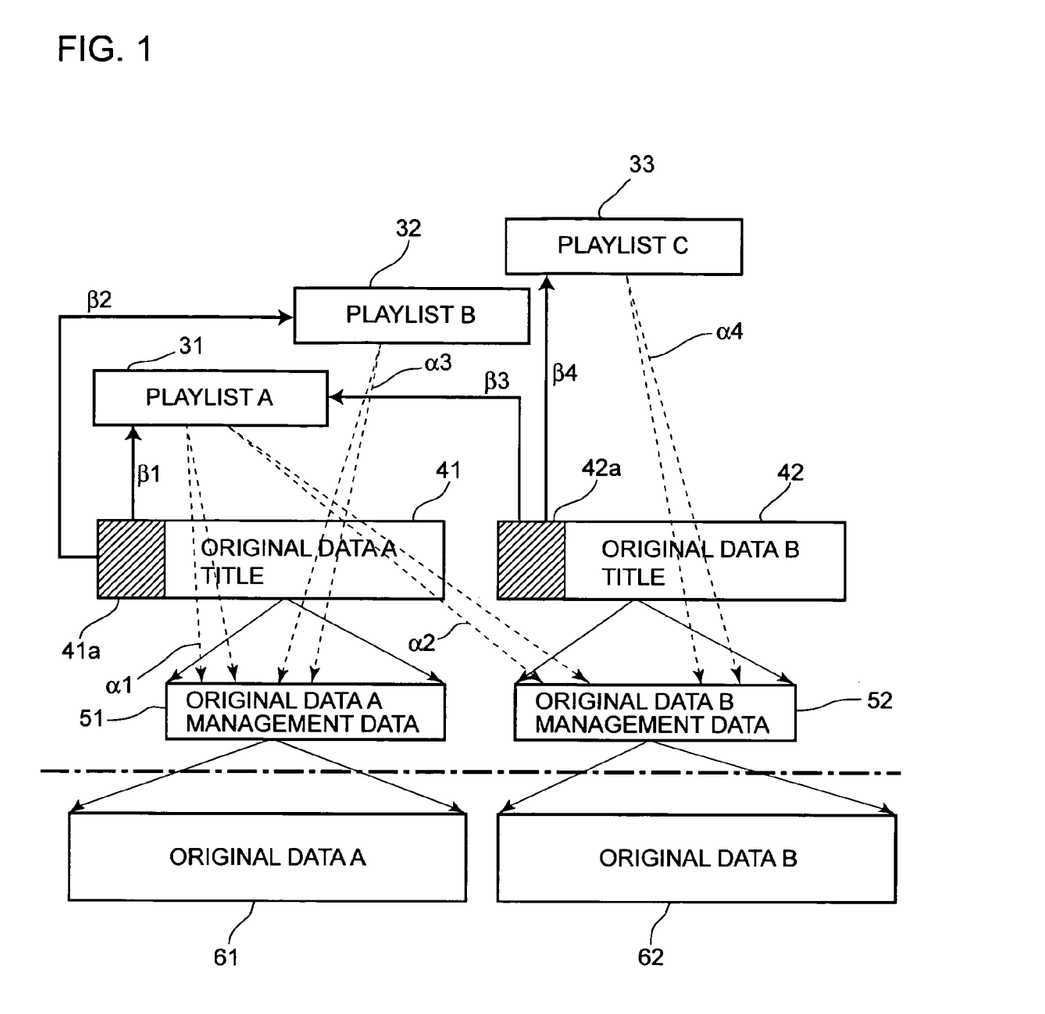
FIG. 1 is a block diagram showing a relationship among various data in an image data processing device according to the present invention.

Next, a recording process step performed by the HDD recorder 1 of the present embodiment will be described with reference to a block diagram shown in FIG. 1 and a flowchart shown in FIG. 2. FIG. 1 is a block diagram showing a relationship among original data, original data management data, an original data title, and a playlist. Unlike the relationship among data in the conventional hard disk recorder shown in FIG. 6, an association information storage area 41a and an association information storage area 41b are added to the diagram shown in FIG. 1. The association information storage area 41a has a one-to-one relationship with an original data A title 41. In addition, an association information storage area 42a has a one-to-one relationship with an original data B title 42. The association information storage areas 41a and 41b are areas for storing various types of data that are used in a playlist creating process that will be described later, and they are not used for storing data or the like for the recording process.

Figure 2:
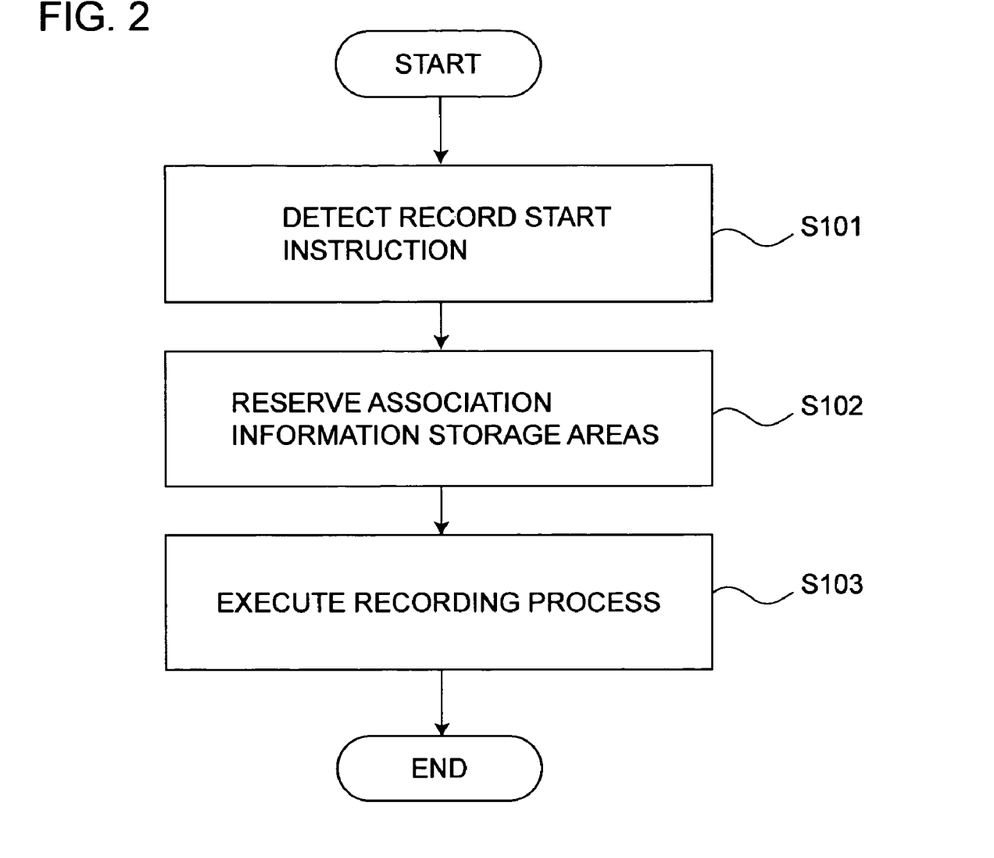
FIG. 2 is a flowchart of a recording process performed by the image data processing device according to the present invention.

As shown in FIG. 2, when the control portion 11 detects a record start instruction from the user, this step is started (S101). Note that the record start instruction is issued when the user uses the operation button group 21 for a recording operation, when a preset recording time of recording reservation has come, or when an automatic recording function of the HDD recorder 1 is executed.

When the control portion 11 receives the instruction to start the recording process, it reserves an area for generating the original data title, the original data management data and the original data for each of the contents to be recorded. As shown in FIG. 1 for example, if the content A is recorded, the original data A title 41, an original data A management data 51, and an original data A 61 are generated. In this case, the association information storage area 41a is generated in association with the original data A title 41 (S102).

Next, the recording process of the content A is performed (S103). Since the content of the recording process is the same as the conventional technique, descriptions thereof will be omitted here.

(3. Playlist Generating Step)

Next, a playlist generating step in the HDD recorder 1 of the present embodiment will be described with reference to the block diagram shown in FIG. 1 and a flowchart shown in FIG. 3.

Figure 3:
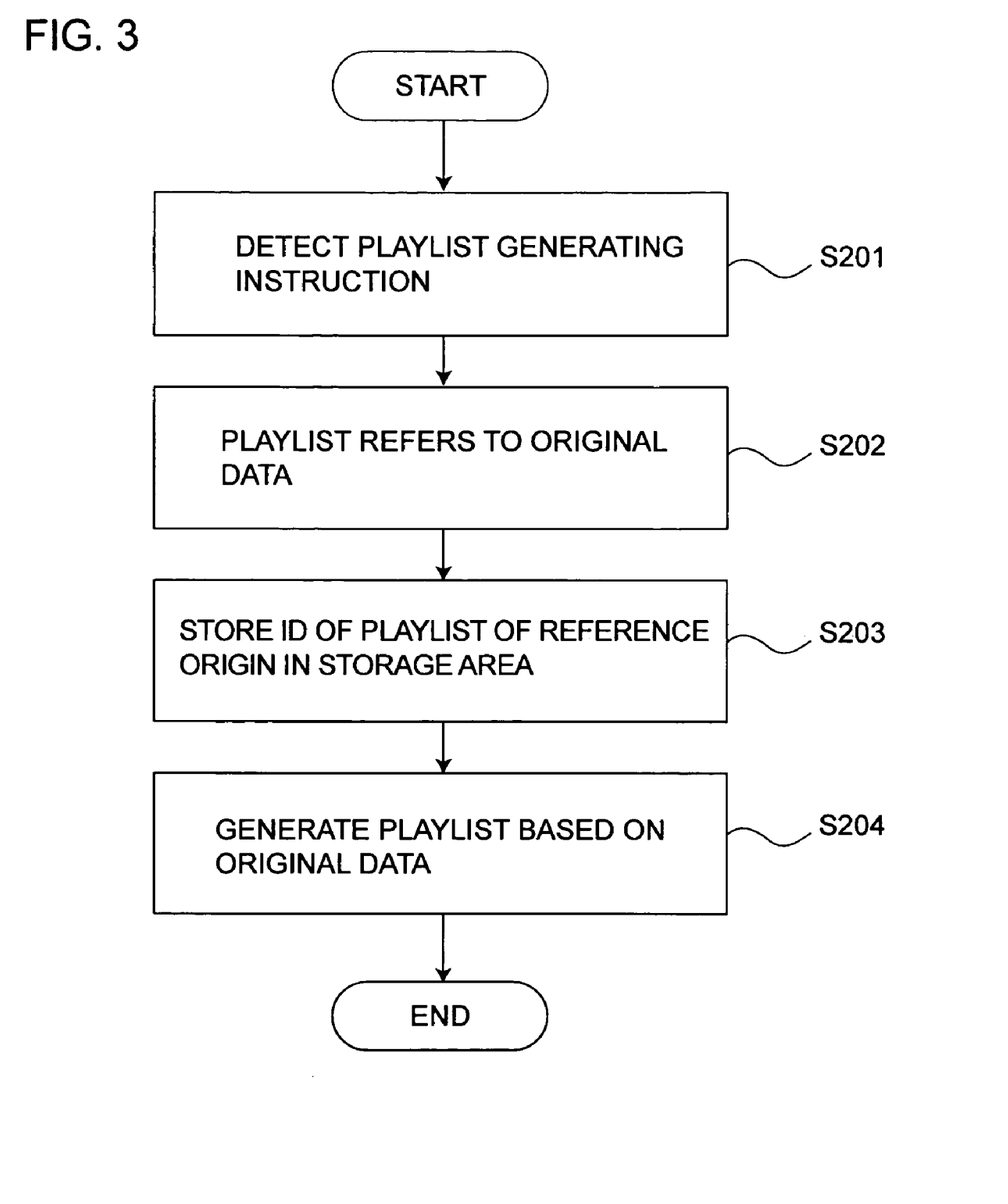
FIG. 3 is a flowchart of a playlist creating process performed by the image data processing device according to the present invention.

As shown in FIG. 3, when the control portion 11 detects a playlist generating instruction from the user, this step is started (S201). Note that the playlist generating instruction is issued when the user operates the operation button group 21, for example.

When the control portion 11 detects the playlist generating instruction from the user, it generates a playlist in accordance with the instruction from the user. In the playlist generating process, a partial area is designated by using original data management information that refers to the original data based on the playlist, and it is registered in the playlist (S202).

In this case, an identifier (e.g., an ID value, a playlist name, or the like) for identifying uniquely the playlist of the reference origin is stored in the association information storage area of the referred original data (S203).

As an example, the process when the user creates a playlist A 31 as shown in FIG. 1 will be described. The user selects original data titles of contents to be registered in the playlist A (the original data A title 41 and the original data B title 42 in this example) from a plurality of original data titles. Then, the user designates an area to be extracted (extracts the partial area) from the original data management data corresponding to the selected original data titles (the original data A management data 51 and the original data B management data 52 in this example) (see arrows α1 and α2 in FIG. 1). When the control portion 11 detects that the partial area was extracted, it stores the playlist identifier of the reference origin (the identifier of the playlist A 31 in this example) in the association information storage area corresponding to the original data management data of the extraction (the association information storage area 41a and the association information storage area 42a in this example).

The user performs the above-mentioned process once or a plurality of times for extracting the partial areas and designating a reproduction order of the extracted partial areas. Thus, the playlist is generated (S204). Since the detail of the playlist creating process is the same as the conventional technique, descriptions thereof will be omitted.

(4. Playlist Updating Process Step When Original Data are Deleted)

Next, playlist updating process step when original data are deleted in the HDD recorder 1 of the present embodiment will be described with reference to the block diagram shown in FIG. 1 and a flowchart shown in FIG. 4.

Figure 4:
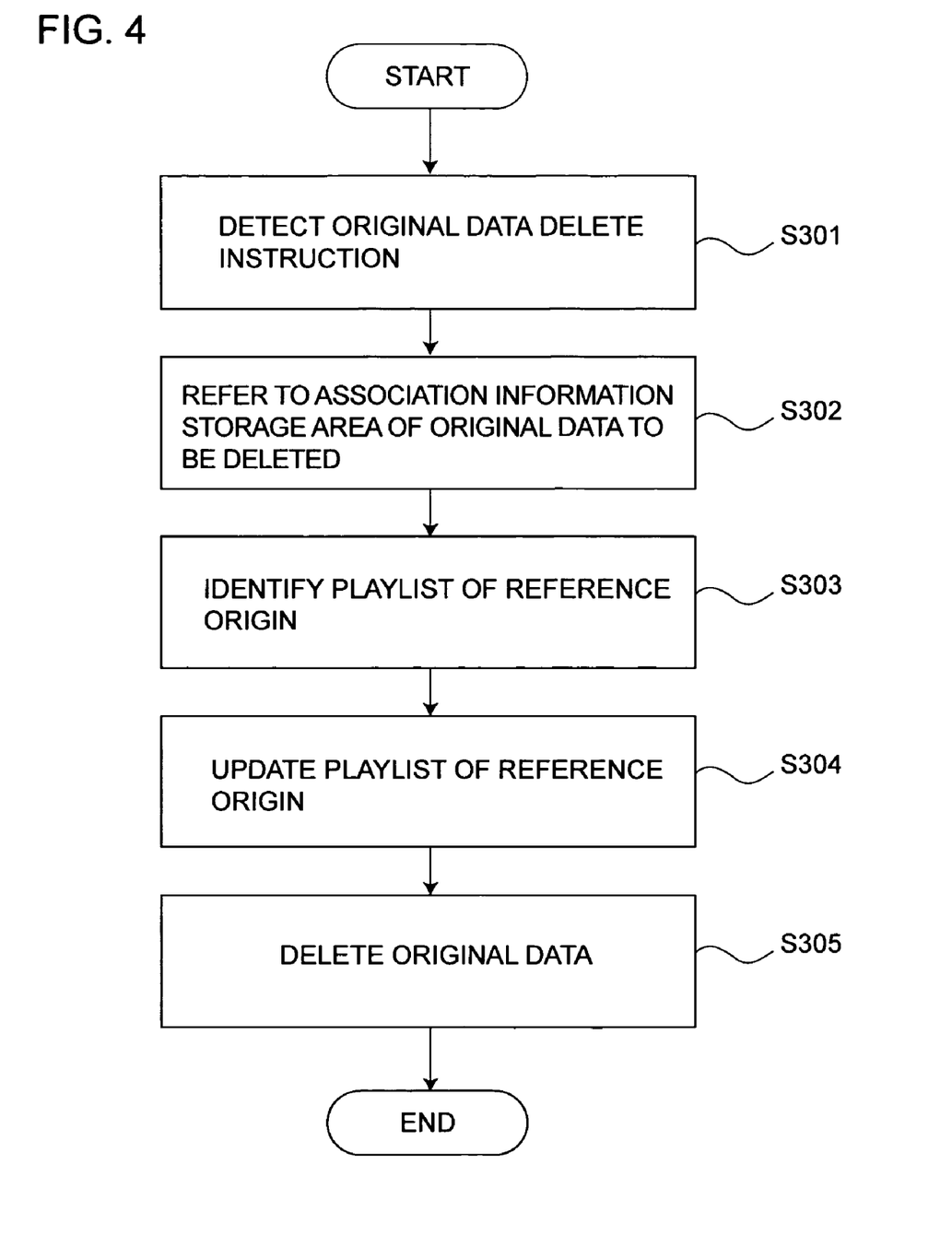
FIG. 4 is a flowchart of an image data deleting process performed by the image data processing device according to the present invention.

As shown in FIG. 4, when the control portion 11 receives an original data delete instruction from the user, this step is started (S301). The delete start instruction is issued when the user performs a delete operation by using the operation button group 21, or when a forced delete function is performed for securing a recording area when a preset recording reservation is executed, for example.

When the control portion 11 receives the original data delete instruction, it refers to the association information storage area of the data to be deleted for checking whether or not the playlist refers to the original data to be deleted (S302).

As an example, the process when the user deletes the original data B title 42 as shown in FIG. 1 will be described. When the original data B title 42 is deleted, the original data B 62 and the original data B management data 52 that are associated in one-to-one relationship are also deleted. However, there is a possibility that the original data B management data 52 are referred to by any playlist (in this example, the playlist A 31 and the playlist C 33 refer to the same), the playlist of the reference origin must be deleted or the contents thereof must be updated.

In order to check whether or not any playlist refers to the original data B management data 52, the control portion 11 refers to the association information storage area so as to obtain the playlist identifier that was stored in the step S203 shown in FIG. 3. In this example, the identifiers of the playlist A 31 and the playlist C 33 are obtained, and the playlist of the reference origin is identified as shown in FIG. 1 by the arrows β3 and β4 (S303).

The control portion 11 deletes the playlist of the reference origin identified in the step S303 (the playlist A 31 and the playlist C 33 in this example) or updates a part of contents of the same (S304). Next, it deletes the original data (the original data B 62) to be deleted and the association data of the original data (the original data B title 42 and the original data B management data 52) (S305).

(5. Various Features of the Present Embodiment)

According to the present embodiment, when original data are stored in the real image data storage area 13a of the HDD recorder 1, the association information storage areas are reserved in the management data storage area 13b for each of the original data (S102). When the original data are referred to by the playlist function and the partial area of the original data is registered in the playlist, the identifier (an ID, a playlist name, or the like) for identifying the reference origin playlist uniquely is stored in the association information storage area of the referred original data (S203).

Further, according to the present embodiment, when the user issues an instruction to delete the original data stored in the real image data storage area 13a, the control portion 11 refers to the association information storage area of the original data to be deleted and obtains the identifier of the stored reference origin playlist (S302). It identifies the playlist of the reference origin (the playlist that refers to the original data to be deleted) based on the obtained identifier (S303) and deletes the identified playlist or edits the playlist (performs deletion or the like of the part of the playlist that is associated to the original data to be deleted) (S304).

It is necessary in the conventional technique to search internal data of all playlists for identifying playlists that refer to the original data to be deleted when the original data is deleted. In the present embodiment, however, such a search process is not necessary, so that the number of steps in the process of deleting the original data can be reduced largely compared with the conventional playlist function. As a result, it is possible to shorten the user's waiting time during the process largely.

Although the present invention is described based on the above preferred embodiment and examples, the present invention is not limited to the above embodiment and examples but can be embodied in various modification in the scope of its technical concept.

For example, a recording medium on which software program code for realizing the functions of the embodiment described above may be supplied to the HDD recorder 1, so that the computer (CPU) of the HDD recorder 1 reads out the program code recorded on the recording medium and executes the program.

In this case, the program code read out from the recording medium realizes the function of the embodiment described above, and the recording medium on which the program code is recorded constitutes the present invention.

As the recording medium for supplying the program code, a floppy disk, a hard disk, an optical disc, a magnet-optical disc, a CD-ROM, a CD-R, a magnetic tape, a non-volatile memory card, a ROM, or the like can be used, for example.

In addition, the operation of the computer to execute the read program code for realizing the function of the embodiment described above may include a case where the operating system (OS) or other programs working on the computer execute a part of the process in accordance with commands from the program code.

Furthermore, it may include the case where the program code read out of the recording medium is written into a memory of a function extension board that is inserted in the computer or a function extension unit that is connected to the computer, and then a CPU or the like of the function extension board or the function extension unit executes a part of the process in accordance with commands from the program code.

In addition, the image data processing method of the present invention can be applied not only to the HDD recorder but also to other image data processing devices. The other image data processing device may include a DVD recorder, a video tape recorder (VTR), a digital video recorder, a personal computer, and a digital video camera.

Although the playlist is generated based on the original data in the examples described above, the present invention can be applied to the case where the playlist is generated based on the image data registered in the playlist (the partial area of the original data). More specifically, when the playlist B is generated by referring to the playlist A, the identifier of the playlist (playlist B) that refers to the playlist of the reference origin (playlist A) is stored in the association information storage area of the original data to which the playlist A refers. Thus, information indicating a relationship among the original data and a plurality of playlists can be managed easily for each of the original data.

What is claimed is:

1. An image data processing device, comprising:
a memory portion for storing image data; and
a control portion for extracting a part or the whole of the image data as a partial area, determining a reproduction order for continuously reproducing one or more of the extracted partial areas in accordance with an instruction from a user, and storing the determined reproduction order as an image data index in the memory portion, wherein
when the image data is stored in the memory portion, the control portion generates an association information storage area which is an area for storing association information that indicates association between the image data and the image data index in the memory portion such that the association information storage area is associated with title information on the image data,
when the image data was used to create the image data index, the control portion stores identification information for identifying the image data index created using the image data in the association information storage area previously generated for the image data, and
when an instruction to delete the image data is detected, the control portion references the association information storage area associated with the tile information on the image data, reads out the identification information stored in the association information storage area, discriminates the image data index created using the image data based on the identification information, and updates the discriminated image data index.

2. The device according to claim 1, wherein
when the image data was used to create the image data index, the control portion stores, as the identification information, an identifier for discriminating the image data index created using the image data in the association information storage area.

3. The device according to claim 1, wherein
the control portion accepts designation of a second reproduction range for reproducing part of a reproduction range indicated by the image data index, accepts designation of a reproduction order of a plurality of second reproduction ranges designated, creates a second image data index indicating the second reproduction ranges and the reproduction order, and, when the image data index was used to create the second image data index, stores identification information for discriminating the second image data index created using the image data in the association information storage area previously generated for the image data to which the image data index refers.

4. An image data processing method, comprising:
an image storing step for storing image data in a memory portion;
an image data index generating step in which the control portion extracts a part or the whole of the image data as a partial area, determines a reproduction order for continuously reproducing one or more of the extracted partial areas in accordance with an instruction from a user, and stores the determined reproduction order as an image data index in the memory portion;
an association information storage area generating step in which when storing the image data in the memory portion, the control portion generates an association information storage area which is an area for storing information related to the image data in the memory portion such that the association information storage area is associated with title information on the image data, and when the image data was used to create the image data index, the control portion stores identification information for identifying the image data index created using the image data in the association information storage area previously generated for the image data; and
an image data index update step in which, when an instruction to delete the image data is detected, the control portion references the association information storage area associated with the title information on the image data, reads out the identification information stored in the association information storage area, discriminates the image data index created using the image data based on the identification information, and updates the discriminated image data index.

5. The method according to claim 4, further comprising
an association information storing step in which when the image data was used to create the image data index, the control portions stores, as the identification information, an identifier for discriminating the image data index created using the image data in the association information storage area.

6. The method according to claim 4, wherein
in the image data index generating step, the control portion accepts designation of a second reproduction range for reproducing part of a reproduction range indicated by the image data index, accepts designation of a reproduction order of a plurality of second reproduction ranges designated, creates a second image data index indicating the second reproduction ranges and the reproduction order, and, when the image data index was used to create the second image data index, stores identification information for discriminating the second image data index created using the image data into the association information storage area previously generated for the image data to which the image data index refers.

* * * * *